UNITED STATES PATENT OFFICE.

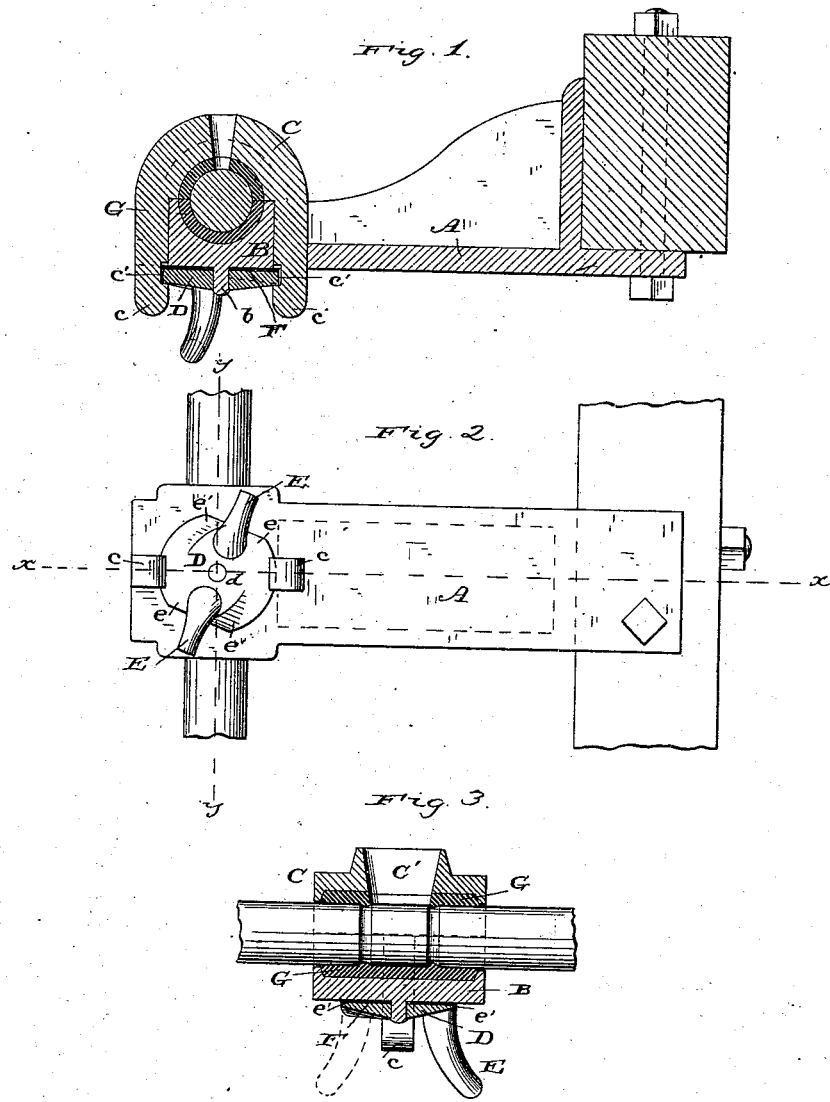

JOHN M. FINCH, OF JACKSON, MICHIGAN.

JOURNAL-BOX.

SPECIFICATION forming part of Letters Patent No. 266,983, dated November 7, 1882.

Application filed September 26, 1882. (No model.)

*To all whom it may concern:*

Be it known that I, JOHN M. FINCH, a citizen of the United States, residing at Jackson, in the county of Jackson and State of Michigan, have invented certain new and useful Improvements in Journal-Boxes, of which the following is a specification, reference being had therein to the accompanying drawings.

This invention relates to an improved device for securing two members or parts of an ordinary shaft-bearing to each other; and it consists essentially in so constituting the parts that the members can be secured to each other without the employment of the usual detachable fastenings.

Figure 1 is a vertical section taken on line $xx$ of Fig. 2. Fig. 2 is a bottom view. Fig. 3 is a vertical section taken on line $yy$ of Fig. 2.

In the drawings I have shown my invention as being applied to a bearing one member of which is attached to a projection or bracket-arm, A.

B is the lower member of the bearing, and is provided with two mortises, substantially square in cross-section, to receive legs $c$, which project from the lower face of the other member, C. The inner faces of these legs $c$ are notched at $c'$.

C' is an oil or grease receptacle formed in the upper face of the part C, and D is a locking-button pivoted at $d$ upon the stud $v$, which projects from the lower face of the member B. This stud is riveted at its outer end, so as to hold the locking-button firmly in place, and may consist of a wrought-iron stud placed in the sand, so that the member B shall be cast about it; or it may be screw-threaded at its lower end and screwed into a hole formed for its reception in the part B; or it may consist of a short screw engaging with a screw-threaded hole in the part B, to which it is applied after the locking-button D has been placed in position.

E E are legs or thumb-pieces projecting in a downward direction from the locking-button, by which to rotate it. The button is flattened upon opposite sides, as at $e\,e$, Fig. 2, its periphery being made cam-shaped, as is indicated in Figs. 2 and 3, being thinnest at the points $e'$ and thickest at the opposite ends of each segment of its periphery.

F is an elastic washer placed between the locking-button and the member B, and compressed between these parts to such an extent as to constitute a friction-stop to prevent the displacement of the locking-button.

G is Babbitt metal or other suitable material, forming a lining within the bearing in the usual manner.

It will be readily seen that when the legs are thrust through the mortises in the member B and the locking-button is turned into the position shown in the drawings the two members of the box are held firmly together, and the members can be separated by simply so turning the button that its flat edges $e\,e$ are opposite the notches $c'\,c'$ of the legs.

I do not wish to be limited to the exact construction shown, as many structural modifications might be made without departing from that part of my invention which relates to securing the two members of a bearing to each other by means of a movable locking device which is permanently attached to one member and engages with projecting portions of the other member.

My invention may be modified as follows: Instead of forming the legs $c$ upon the upper detachable member, C, they may be formed upon or attached to the lower member, the upper member being mortised to receive them, in which case the locking-button would be attached to the upper member in suitable position to engage to enter the notches in the legs, and thus secure the parts firmly together. In such construction the button would occupy substantially the position of the oil or grease receptacle, in which case it would be desirable to form the upper member with a grease-receptacle at one end or both ends, leaving room for the locking-button to occupy a central position.

What I claim is—

1. In a shaft-bearing, a member provided with projecting portions which pass upon opposite sides of the second member, and a locking device permanently attached to said second member, substantially as set forth.

2. In a shaft-bearing, a member provided with mortises or recesses and having a locking device permanently attached thereto, in combination with a member having projecting legs which enter said mortises or recesses and are adapted to engage with the locking device, substantially as set forth.

3. In a shaft-bearing, the combination, with the locking-button and its pivotal parts, of the friction-stop, adapted to prevent accidental displacement of the button, substantially as set forth.

In testimony whereof I affix my signature in presence of two witnesses.

JOHN M. FINCH.

Witnesses:
  CHAS. F. KNAPP,
  JUNE HAYES.